May 18, 1943.  B. GOLD  2,319,398
PHOTOGRAPHIC APPARATUS
Filed Dec. 17, 1941
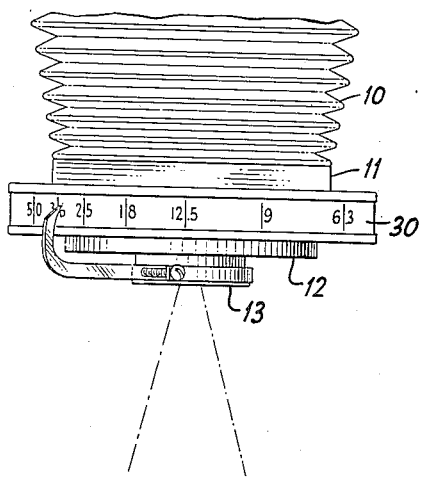
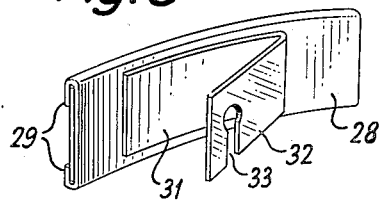
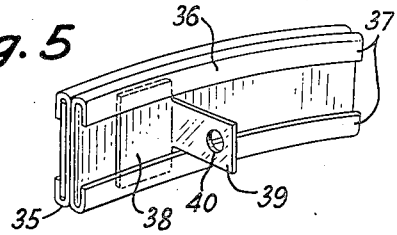
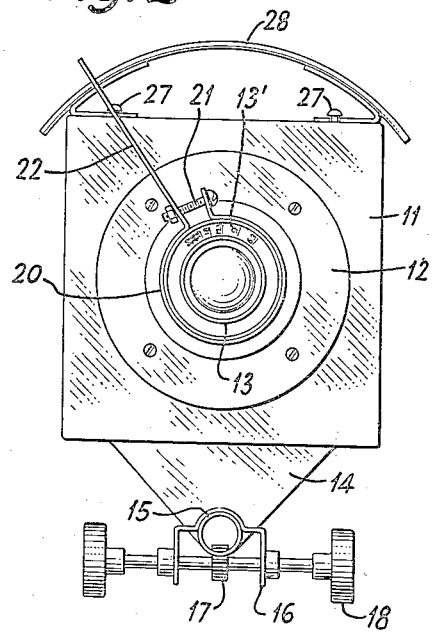
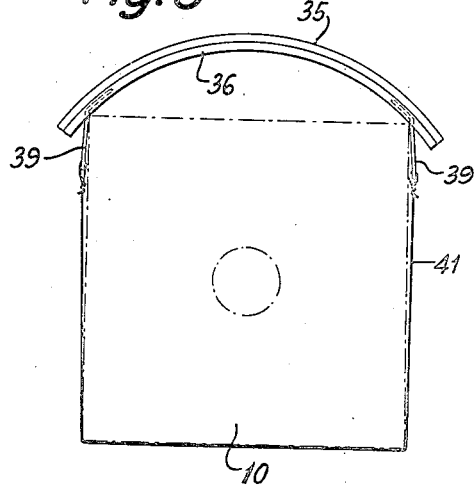
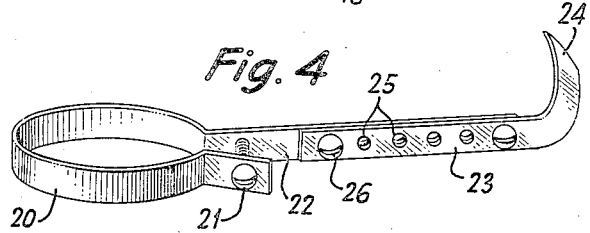
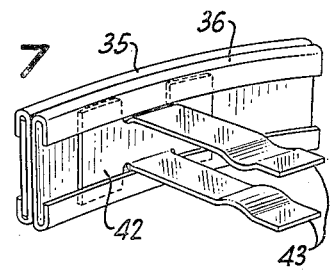
INVENTOR
BENJAMIN GOLD
BY
William A. Zalesak
ATTORNEY Patented May 18, 1943

2,319,398

UNITED STATES PATENT OFFICE 2,319,398

PHOTOGRAPHIC APPARATUS

Benjamin Gold, Brooklyn, N. Y.

Application December 17, 1941, Serial No. 423,279

7 Claims. (Cl. 95—64)

My invention relates to photographic apparatus, more particularly to lens diaphragm control and indicating devices for use with enlarging apparatus.

In the usual enlarging apparatus the lens carrying bellows is mounted in a vertical position and is adjusted in a vertical direction. Mounted at the lower end of the bellows is a lens mount supporting a lens system for directing the projected picture from the negative within the enlarging apparatus onto the enlarging paper lying in a horizontal plane. The aperture openings are usually marked on the end of the lens barrel and it is difficult, if not impossible, to see these indications, particularly when the device is operated in semi-darkness. Even with an extended lens it is practically impossible to read the diaphragm openings. No convenient indicating means is provided with the conventional equipment for advising the operator of the aperture opening.

It is desirable to have an easily attached adjusting and indicating device which can be applied to enlargers in existence, and which is simple in construction. It must also be a device which can be readily attached to the wooden frame in which the lens may be mounted as well as to a metal frame should a metal mount be used. It is also desirable that such a device be applicable to enlargers of various sizes and be one which can be conveniently and easily operated and in which the indicating scale is clearly visible and which can be attached to the enlarging bellows to cooperate with the adjusting lever and indicating pointer.

An object of my invention is to provide a diaphragm control device and indicator for a lens system, particularly suitable for use with an enlarger, particularly an enlarger utilizing a vertical lens and bellows system.

It is another object of my invention to provide such a device which is simple in construction and which can be readily mounted on different types of bellows, whether the bellows utilizes either wood or metal frames or lens mounts.

It is a still further object of my invention to provide such a device which can be secured to enlargers of different sizes employing different size lenses.

It is a further object of my invention to provide such a device in which the scale can be readily seen in semi-darkness.

Referring to the drawing, Figure 1 shows the lower end of the bellows and lens arrangement of the conventional enlarger with my invention associated therewith, Figure 2 is a bottom end view of Figure 1, Figures 3 and 4 are details of construction of my invention shown in Figures 1 and 2, Figures 5, 6 and 7 show details of modifications of my invention shown in Figures 1 to 4, inclusive.

Referring to Figure 1, the bellows 10 of the enlarging equipment is provided with a lower end member serving as a lens mount or lens support 11 to which is attached the lens assembly 12, supporting the lens 13, which as shown in Figure 2 has the aperture openings inscribed as at 13' on the lower end of the lens barrel. The lower end of the bellows 10 may be attached to a bracket 14 provided with a collar member 15, having attached thereto a yoke 16 to which the gear mechanism for vertically positioning the lens arrangement is accomplished by means of the gear 17 cooperating with a rack, not shown, when the members 18 are rotated to position the lens with respect to the board upon which the sensitive paper is positioned.

In accordance with my invention I provide a combined lever and indicating device 22 having the collar member 20 adapted to be secured to the lens barrel. As best shown in Figures 2 and 4, the diameter of this collar member 20 may be adjusted for different diameter lenses by means of adjusting screw 21, and the length of the arm may be adjusted by providing apertures 25 and screw members 26 for permitting adjustment of the length of the arm by moving portion 23 in or out with respect to the portion attached to the collar 20, the end 24 serving as the finger control and indicator.

As best shown in Figures 2 and 3, the scale 28 is provided with a pair of brackets 32 secured to the scale support by means of the portion 31 by welding or otherwise, the free-end being provided with a slot 33 which cooperates with pins 27 which in the case of wood may be screws, or in the case of a metal lens support 11 may be threaded screw members.

The scale support 28 is provided with lips 29 turned inwardly toward each other into which the scale 30 proper is placed. The numerals indicating the aperture opening may be filled in with luminous paint, for example, after my invention is attached to the enlarger and the position of the pointer is determined for the various openings of the lens diaphragm.

In operation, therefore, the lens may be easily adjusted and the aperture opening clearly determined with ease by glancing at the scale. My simplified construction permits the use of my invention with substantially any size or type enlarger now available.

In Figures 5 and 6 I show a modification of my invention and a different means of attachment. As shown in Figure 5 two members 35 and 36 are placed back-to-back, the member 35 supporting the scale and the member 36 a pair of adjustable elements 39 which slide in a groove provided by the turned-in lips 37. The portion 38 slides within the groove and the outwardly extending element 39 is provided with an aperture 40 through which an elastic cord or member 41 is threaded and secured. By adjusting the position of the members 39 with respect to each other, the arc-shaped scale support may be applied to the end of an enlarger of any size, as shown in Figure 6.

In some cases the element 11 of the bellows member is a thin flat sheet extending out beyond the bellows. In this case the form shown in Figure 7 may be utilized and the sheet clamped between the jaws 43 of the clamp member provided with the portion 42 slidable in the groove of element 36.

It is obvious that with my invention it is possible to apply the device to any of the enlargers now used and the problem of easily and promptly adjusting the aperture opening in semi-darkness is eliminated. It is possible to not only adjust the aperture easily by means of the lever arrangement but also to determine its opening by means of the scale which can be attached to any type of bellows arrangement. My invention provides a construction which is extremely simple and which can be used with a wooden or metal lens mount construction. Furthermore my device may be secured to enlargers of various sizes.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A diaphragm adjusting and indicating device for use with photographic apparatus utilizing a lens assembly supported on a lens mount, and comprising a lever having an expansible collar for engaging the barrel of said lens for adjusting the diaphragm opening, and a scale cooperating with said lever and including an arc-shaped member having a pair of brackets and means engaging said brackets and the lens mount for detachably securing said scale to said lens mount, and a pointer on said lever which moves over said scale when the diaphragm is adjusted to visually indicate the aperture opening of said diaphragm.

2. A diaphragm adjusting and indicating device for use with photographic apparatus utilizing a lens assembly supported on a lens mount, and comprising a lever having an expansible collar for engaging the barrel of said lens for adjusting the diaphragm opening, and a scale cooperating with said lever and including an arc-shaped member having a pair of brackets for detachably securing said scale assembly to said lens mount, and a pointer on said lever which moves over said scale assembly when the diaphragm is adjusting to visually indicate the aperture opening of said diaphragm, each of said brackets having a slot in its free end and means on said mount for engaging said slots to detachably support said scale on said lens mount.

3. A diaphragm adjusting and indicating device for use with photographic apparatus utilizing a lens assembly supported on a lens mount and comprising a lever having an expansible collar for engaging the barrel of said lens for adjusting the diaphragm opening, and a scale assembly cooperating with said lever and including an arc-shaped member having a pair of brackets for detachably securing said scale assembly to said lens mount, and a pointer on said lever which moves over said scale assembly when the diaphragm is adjusted to visually indicate the aperture opening of said diaphragm, each of said brackets having a slot in its free end and means on said lens mount engaging said slots to detachably support said scale assembly on said mount, said arc-shaped member having a pair of lips turned toward each other for receiving a scale indicating strip to which numerals may be applied when said lever is properly calibrated.

4. A diaphragm adjusting and indicating device for use with photographic apparatus utilizing a lens assembly supported on a lens mount and comprising a lever having an expansible collar for engaging the barrel of said lens for adjusting the diaphragm opening, and a scale assembly cooperating with said lever and including an arc-shaped member having a pair of brackets for detachably securing said scale assembly to said lens mount, and a pointer on said lever which moves over said scale assembly when the diaphragm is adjusted to visually indicate the aperture opening, said scale assembly including a supporting element comprising a pair of arcuate shaped members placed back-to-back, each of said members being provided with in-turned lips, one of said members supporting a scale indicating element and the other of said members slidably receiving said pair of brackets, each of said brackets being of L-shape, one portion of which is received between said lips and the other portion of which is secured to a supporting element detachably securing said scale assembly to the lens mount.

5. A diaphragm adjusting and indicating device for use with photographic apparatus utilizing a lens assembly supported on a lens mount and comprising a lever having an expansible collar for engaging the barrel of said lens for adjusting the diaphragm opening, and a scale assembly cooperating with said lever and including a pair of brackets for detachably securing said scale assembly to said lens mount, and a pointer on said lever which moves over said scale assembly when the diaphragm is adjusted to visually indicate the aperture opening of said diaphragm, said scale assembly including a pair of arcuate shaped members placed back-to-back, each of said members being provided with in-turned lips, one of said members supporting a scale indicating element and the other of said members slidably receiving said pair of brackets, each of said brackets being of L-shape, one portion of which is received between said lips and the other portion of which is provided with an aperture and elastic means passing through said aperture and around said lens mount for securing said scale assembly to said lens mount.

6. A diaphragm adjusting and indicating device for use with photographic apparatus utilizing a lens assembly supported on a lens mount and comprising a lever having an expansible collar for engaging the barrel of said lens for adjusting the diaphragm opening, and a scale assembly cooperating with said lever and including a pair of brackets for detachably securing said scale to said lens mount, and a pointer on said lever which moves over said scale assembly when the diaphragm is adjusted to visually indicate the aperture opening of said diaphragm, said scale assembly including a pair of arcuate shaped members placed back-to-back, each of said members being provided with in-turned lips, one of said members supporting a scale indicating element and the other of said members slidably receiving said pair of brackets, each of said brackets comprising a U-shaped member having an extended base, the base being slidably received within the lips of one of said arcuate shaped members and the free ends of the U-shaped legs being extended from the respective arcuate shaped member to receive the lens mount therebetween.

7. A diaphragm adjusting and indicating device for use with photographic apparatus utilizing a lens assembly supported on a lens mount, and comprising a lever having a collar for engaging the barrel of said lens for adjusting the diaphragm opening, and a scale assembly cooperating with said lever and including an arc-shaped member having a pair of brackets and means engaging said brackets and the end of said lens mount for detachably securing said scale assembly to said lens mount, and a pointer on said lever which moves over said scale assembly when the diaphragm is adjusted to visually indicate the aperture opening, the collar on said lever being expansible, said lever including an extensible arm comprising a pair of relatively longitudinal movable sections, and means for fixing said sections in predetermined positions.

BENJAMIN GOLD.